(12) United States Patent
Neff et al.

(10) Patent No.: US 11,488,471 B2
(45) Date of Patent: Nov. 1, 2022

(54) SYSTEMS AND METHODS FOR IDENTIFYING VEHICLES USING WIRELESS DEVICE IDENTIFIERS

(71) Applicant: TKH SECURITY LLC, Cheshire, CT (US)

(72) Inventors: Garett Neff, Cheshire, CT (US); Joseph Ruggero, New York, NY (US); Scott Dubois, Southington, CT (US); Anders Nelson, Astoria, NY (US); Geoffrey Gaetan Naudet, Mesa, AZ (US); Pablo Rozanski, Buenos Aires (AR); Aurelien Ramondou, New York, NY (US); Morgan Kesler, Palmetto, FL (US); Mark Kudas, Minneapolis, MN (US); Chien Hsiang Tang, New York, NY (US)

(73) Assignee: TKH SECURITY LLC, Cheshire, CT (US)

( * ) Notice: Subject to any disclaimer, the term of this patent is extended or adjusted under 35 U.S.C. 154(b) by 210 days.

(21) Appl. No.: 16/720,913

(22) Filed: Dec. 19, 2019

(65) Prior Publication Data

US 2021/0192943 A1   Jun. 24, 2021

(51) Int. Cl.
*G06V 20/52* (2022.01)
*G06V 20/62* (2022.01)
(Continued)

(52) U.S. Cl.
CPC ..... *G08G 1/0175* (2013.01); *G06Q 10/06311* (2013.01); *G06V 20/52* (2022.01);
(Continued)

(58) Field of Classification Search
CPC .... G08G 1/0175; G08G 1/0129; G08G 1/146; G08G 1/017; G06K 9/00771; G06K 2209/15; G06Q 10/06311
See application file for complete search history.

(56) References Cited

U.S. PATENT DOCUMENTS 6,107,942 A   8/2000   Yoo et al.
6,142,702 A   11/2000  Simmons
(Continued)

FOREIGN PATENT DOCUMENTS

WO   2006106369 A1   10/2006

OTHER PUBLICATIONS

Memorandum of Points and Authorities in Support of San Diego County Regional Airport Authority's Motion to Dismiss Amended Complaint Under 35 U.S.C. § 101, United States District Court of the Southern District of California, Case No. 3:18-cv-02068-BEN-MDD, filed Nov. 8, 2018.
(Continued)

*Primary Examiner* — Emily C Terrell
*Assistant Examiner* — Molly Wilburn
(74) *Attorney, Agent, or Firm* — Carter, DeLuca & Farrell LLP; David C. Lee

(57) ABSTRACT

The present disclosure relates to identifying vehicles using wireless device identifiers. In accordance with aspects of the present disclosure, a system for identifying vehicles in a parking structure includes a camera configured to capture images of an area in the parking structure where the camera captures an image containing one or more vehicle(s), a detector configured to scan for wireless device identifiers in the area, and a processing system including an electronic storage. The processing system is configured to execute instructions to access the image containing the vehicle(s) in the area and access one or more wireless device identifier(s)
(Continued)

scanned by the detector in the area, process the image containing the vehicle(s) to extract one or more license plate identifier(s) corresponding to the vehicle(s), and store in the electronic storage at least one record associating the license plate identifier(s) with the wireless device identifier(s).

15 Claims, 10 Drawing Sheets

(51) Int. Cl.
    *G08G 1/017*      (2006.01)
    *G08G 1/01*      (2006.01)
    *G06Q 10/06*      (2012.01)
    *G08G 1/14*      (2006.01)

(52) U.S. Cl.
    CPC ........... *G08G 1/0129* (2013.01); *G08G 1/146* (2013.01); *G06V 20/625* (2022.01)

(56) References Cited

U.S. PATENT DOCUMENTS

| | | | |
|---|---|---|---|
| 6,426,708 B1 | 7/2002 | Trajkovic et al. | |
| 6,493,676 B1 | 12/2002 | Levy | |
| 9,420,423 B1* | 8/2016 | Mendelson | H04W 4/80 |
| 9,773,414 B2* | 9/2017 | Wang | H04W 4/80 |
| 10,093,223 B2* | 10/2018 | Pal | G08G 1/163 |
| 10,121,172 B2* | 11/2018 | Hudson | G07B 15/02 |
| 10,409,290 B2* | 9/2019 | Mielenz | G06K 9/00785 |
| 10,445,601 B2* | 10/2019 | Herman | G06K 9/00785 |
| 11,188,938 B2* | 11/2021 | Kirk | H04L 9/0816 |
| 2002/0008639 A1* | 1/2002 | Dee | G07B 15/02 340/932.2 |
| 2004/0059693 A1 | 3/2004 | Hausen et al. | |
| 2004/0138929 A1 | 7/2004 | Awiszus et al. | |
| 2005/0235587 A1 | 10/2005 | Blumberg et al. | |
| 2006/0149684 A1 | 7/2006 | Matsuura et al. | |
| 2007/0050240 A1 | 3/2007 | Belani et al. | |
| 2008/0151051 A1 | 6/2008 | Konno et al. | |
| 2008/0258935 A1 | 10/2008 | Lee | |
| 2009/0083091 A1 | 3/2009 | Rust et al. | |
| 2009/0085772 A1 | 4/2009 | Huang et al. | |
| 2009/0192950 A1 | 7/2009 | King et al. | |
| 2009/0248577 A1 | 10/2009 | Hoj | |
| 2009/0273470 A1 | 11/2009 | Sinkevicius et al. | |
| 2009/0303079 A1 | 12/2009 | Khim | |
| 2009/0309760 A1 | 12/2009 | Chew | |
| 2009/0315738 A1 | 12/2009 | Falk et al. | |
| 2010/0063641 A1 | 3/2010 | Scholten | |
| 2010/0302933 A1 | 12/2010 | Sreenan et al. | |
| 2010/0309024 A1 | 12/2010 | Mimeault | |
| 2011/0063446 A1 | 3/2011 | McMordie et al. | |
| 2011/0093314 A1 | 4/2011 | Redmann et al. | |
| 2012/0095812 A1* | 4/2012 | Stefik | G06Q 50/265 705/13 |
| 2012/0326893 A1 | 12/2012 | Glezerman | |
| 2013/0113936 A1* | 5/2013 | Cohen | G08G 1/14 348/148 |
| 2015/0142533 A1* | 5/2015 | Shalev | G07F 17/246 705/13 |
| 2016/0171502 A1* | 6/2016 | Maenpaa | G06Q 20/327 705/44 |
| 2016/0328970 A1* | 11/2016 | Wang | G08G 1/142 |
| 2017/0124874 A1* | 5/2017 | Cai | G08G 1/0175 |
| 2017/0255881 A1* | 9/2017 | Ritch | G08G 1/096883 |
| 2017/0351267 A1* | 12/2017 | Mielenz | G05D 1/0289 |
| 2019/0385453 A1* | 12/2019 | Dome | G08G 1/0175 |

OTHER PUBLICATIONS

Declaration of Eric M. Acker in Support of San Diego County Regional Airport Authority's Motion to Dismiss Amended Complaint Under 35 U.S.C. § 101, United States District Court of the Southern District of California, Case No. 3:18-cv-02068-BEN-MDD, filed Nov. 8, 2018.

Park Assist's Memorandum in Opposition to San Diego County Regional Airport Authority's and ACE Parking Management, Inc.'s Motion to Dismiss Under 35 U.S.C. § 101, United States District Court of the Southern District of California, Case No. 18-CV-2068-BEN-MDD, filed Nov. 26, 2018.

Reply in Support of San Diego County Regional Airport Authority's Motion to Dismiss Amended Complaint Under 35 U.S.C. § 101, United States District Court of the Southern District of California, Case No. 3:18-cv-02068-BEN-MDD, filed Dec. 3, 2018.

Order Denying Defendants' Motions to Dismiss [Docs. 25, 26], United States District Court of the Southern District of California, filed Aug. 26, 2019.

\* cited by examiner

License Plate ID :
   FMK-321
Time : January 10, 2019 10:04:00 AM
Location : LOC_10_Unit_1
Wireless Device IDs :
   A0 : B1 : C2 : D3 : E4 : F5
   ___   ___   ___
   ___   ___   ___

License Plate ID :
   FMK-321
Time : January 10, 2019 10:04:55 AM
Location : LOC_10_Unit_3
Wireless Device IDs :
   ___   ___   ___
   ___   ___   ___
   A0 : B1 : C2 : D3 : E4 : F5

FIG. 8

SYSTEMS AND METHODS FOR IDENTIFYING VEHICLES USING WIRELESS DEVICE IDENTIFIERS

TECHNICAL FIELD

The present disclosure relates to identifying vehicles, and more particularly, to identifying vehicles using wireless device identifiers.

BACKGROUND

Automobile vehicles are the main mode of transportation in large parts of the world. Vehicle parking is a complex issue in dense areas or venues where there is high demand for space. Rules relating to vehicle parking can assist with managing the vehicle parking experience. For example, poorly crafted or outdated parking rules can negatively impact people's experiences in an area or venue, such as, for example, rules that lead to lack of parking availability or lack of reasonable parking economics. Technology can assist with addressing vehicle parking complications. For example, in various situations, outdated parking structures can be fitted with new technologies that augment the capabilities of the parking structure and improve the parking experience. Accordingly, there is continuing interest in developing and improving technologies for addressing vehicle parking.

SUMMARY

The present disclosure relates to identifying vehicles using wireless device identifiers. One aspect of the present disclosure relates to setting a wireless device identifier as an alternative to a vehicle license plate identifier.

In accordance with aspects of the present disclosure, a system for identifying vehicles in a parking structure includes a camera configured to capture images of an area in the parking structure where the camera captures an image containing at least one vehicle in the area, a detector configured to scan for wireless device identifiers in the area, and a processing system including an electronic storage. The processing system is configured to execute instructions to access the image containing the at least one vehicle in the area and access at least one wireless device identifier scanned by the detector in the area, process the image containing the at least one vehicle to extract at least one license plate identifier corresponding to the at least one vehicle, and store in the electronic storage at least one record associating the at least one license plate identifier with the at least one wireless device identifier.

In various embodiments of the system, the at least one record includes a record configured to associate one wireless device identifier with multiple license plate identifiers. In various embodiments of the system, the at least one record includes a plurality of records relating to the one wireless device identifier, where each of the plurality of records associates the one wireless device identifier with a set of one or more license plate identifiers. In various embodiments of the system, the processing system is further configured to execute the instructions to process the plurality of records relating to the one wireless device identifier to identify a first license plate identifier for which the one wireless device identifier is to be indicated as an alternative, and indicate the one wireless device identifier as an alternative to the first license plate identifier.

In various embodiments of the system, the at least one record includes a record configured to associate one license plate identifier with multiple wireless device identifiers. In various embodiments of the system, the at least one record includes a plurality of records relating to the one license plate identifier, where each of the plurality of records associating the one license plate identifier with a set of one or more wireless device identifiers. In various embodiments of the system, the processing system is further configured to execute the instructions to process the plurality of records relating to the one license plate identifier to identify a first wireless device identifier to be indicated as an alternative to the one license plate identifier, and indicate the first wireless device identifier as an alternative to the one license plate identifier for identifying the vehicle. In various embodiments of the system, in processing the plurality of records relating to the one license plate identifier to identify the first wireless device identifier, the processing system is further configured to execute the instructions to identify the first wireless device identifier as having a highest number of occurrences in the plurality of records.

In various embodiments of the system, the processing system is further configured to execute the instructions to access a second image and a second plurality of wireless device identifiers, determine that a license plate identifier cannot be extracted from the second image, identify based on the electronic storage at least one wireless device identifier of the second plurality of wireless device identifiers which is indicated as an alternative to a corresponding license plate identifier, and generate a task record associating the second image with the at least one corresponding license plate identifier. In various embodiments of the system, the processing system is further configured to execute the instructions to communicate a notification to personnel at the parking structure regarding the task record, where the notification includes a list of the at least one corresponding license plate identifier.

In various embodiments of the system, the wireless device identifiers include Bluetooth device identifiers, and the processing system includes a cloud system outside the parking structure.

In various embodiments of the system, the processing system is further configured to execute the instructions to process the image containing the at least one vehicle to extract at least one visual characteristic corresponding to a particular vehicle of the at least one vehicle to provide a digital fingerprint for the particular vehicle, and store the digital fingerprint in the electronic storage in at least one of the at least one record.

In accordance with aspects of the present disclosure, a system for identifying vehicles in a parking structure includes a plurality of cameras in the parking structure where each of the plurality of cameras captures a corresponding image of a vehicle traveling past the corresponding camera, and a plurality of detectors in the parking structure corresponding to the plurality of cameras, where the plurality of detectors is configured to scan for wireless device identifiers and to provide a corresponding set of wireless device identifiers for each corresponding image. The system further includes a processing system including an electronic storage and configured to execute instructions to access the corresponding images and the corresponding sets of wireless device identifiers, process each of the corresponding images to extract a corresponding license plate identifier, and store in the electronic storage records associating each corresponding license plate identifier with the corresponding set of wireless device identifiers.

In accordance with aspects of the present disclosure, a method is disclosed for identifying vehicles in a parking structure having a camera configured to capture images of an area in the parking structure and a detector configured to scan for wireless device identifiers in the area. The method includes accessing an image captured by the camera where the image contains at least one vehicle in the area, accessing at least one wireless device identifier scanned by the detector in the area, processing the image containing the at least one vehicle to extract at least one license plate identifier corresponding to the at least one vehicle, and storing in an electronic storage at least one record associating the at least one license plate identifier with the at least one wireless device identifier.

In various embodiments of the method, the at least one record includes a record configured to associate one wireless device identifier with multiple license plate identifiers.

In various embodiments of the method, the at least one record includes a plurality of records relating to the one wireless device identifier, and each of the plurality of records associate the one wireless device identifier with a set of one or more license plate identifiers.

In various embodiments of the method, the method includes processing the plurality of records relating to the one wireless device identifier to identify a first license plate identifier for which the one wireless device identifier is to be indicated as an alternative, and indicating the one wireless device identifier as an alternative to the first license plate identifier.

In various embodiments of the method, the at least one record includes a record configured to associate one license plate identifier with multiple wireless device identifiers.

In various embodiments of the method, the at least one record includes a plurality of records relating to the one license plate identifier, and each of the plurality of records associates the one license plate identifier with a set of one or more wireless device identifiers.

In various embodiments of the method, the method includes processing the plurality of records relating to the one license plate identifier to identify a first wireless device identifier to be indicated as an alternative to the one license plate identifier, and indicating the first wireless device identifier as an alternative to the one license plate identifier for identifying the vehicle.

In various embodiments of the method, processing the plurality of records relating to the one license plate identifier to identify the first wireless device identifier includes identifying the first wireless device identifier as having a highest number of occurrences in the plurality of records.

In various embodiments of the method, the method includes accessing a second image and a second plurality of wireless device identifiers, determining that a license plate identifier cannot be extracted from the second image, identifying, based on the electronic storage, at least one wireless device identifier of the second plurality of wireless device identifiers which is indicated as an alternative to a corresponding license plate identifier, and generating a task record associating the second image with the at least one corresponding license plate identifier.

In various embodiments of the method, the method includes communicating a notification to personnel at the parking structure regarding the task record, the notification including a list of the at least one corresponding license plate identifier.

In various embodiments of the method, the method includes processing the image containing the at least one vehicle to extract at least one visual characteristic corresponding to a particular vehicle of the at least one vehicle to provide a digital fingerprint for the particular vehicle, and storing the digital fingerprint in the electronic storage in at least one of the at least one record.

Further details and aspects of exemplary embodiments of the present disclosure are described in more detail below with reference to the appended figures.

BRIEF DESCRIPTION OF THE DRAWINGS

FIG. 8 is a diagram of exemplary data records associated with tracking a vehicle through a parking structure;

DETAILED DESCRIPTION

The present disclosure relates to identifying vehicles using wireless device identifiers. One aspect of the present disclosure relates to setting a wireless device identifier as an alternative to a vehicle license plate identifier.

Figure 1:
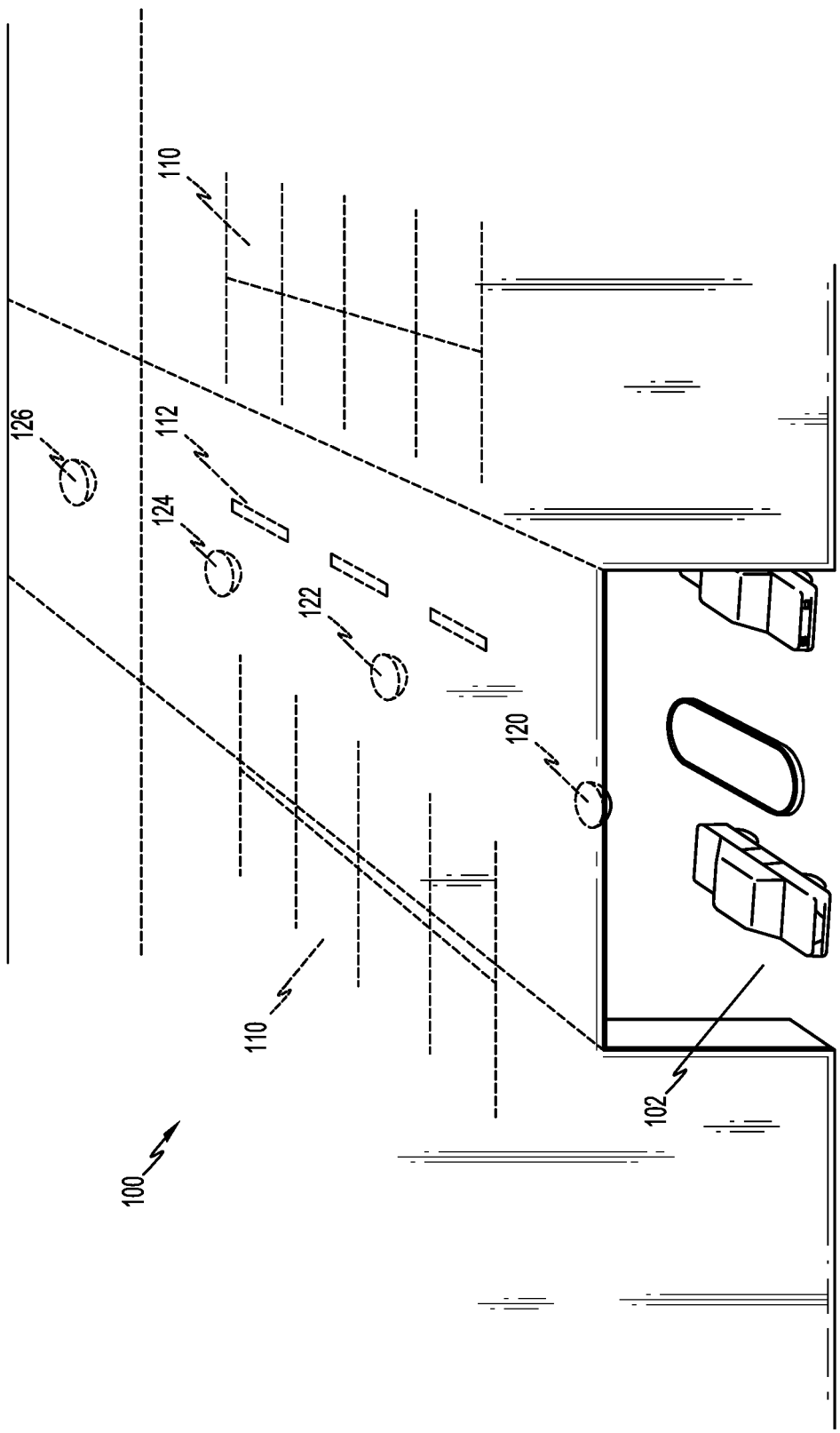
FIG. 1 is a diagram of an exemplary parking structure and various sensors in the parking structure, in accordance with aspects of the present disclosure.

Referring to FIG. 1, there is shown a diagram of an exemplary parking structure 100 in accordance with aspects of the present disclosure. The parking structure 100 includes parking bays 110 for vehicles to park in. The parking bays can be arranged in various arrangements and configurations. For example, as illustrated in FIG. 1, the parking bays 110 can be arranged in rows or columns with driving lanes 112 between the parking bays. In various embodiments, the parking structure 100 can have a single level or can have multiple levels, and the parking structure 100 can be below ground level, at ground level, and/or above ground level. In various embodiments, the parking structure 100 may be enclosed, such as a parking garage, or may not be enclosed, such as a parking field. In various embodiments, a portion or all of the parking structure 100 may have a ceiling or walls, and in various embodiments, a portion or all of the parking structure 100 may not have a ceiling or walls. The term "parking structure" is intended to encompass all such variations and configurations. Accordingly, the illustrated parking structure 100 of FIG. 1 is merely exemplary and does not limit the scope of the present disclosure.

With continuing reference to FIG. 1, the parking structure 100 includes an entrance 102 and various sensor devices 120-126, which will be described in more detail later herein. One sensor device 120 is located at or near the entrance 102, and other sensor devices 122-126 are located in other areas of the parking structure 100. In various embodiments, where the parking structure 100 has ceilings or walls, one or more sensor devices 120-126 can be secured to the ceilings or walls. In various embodiments, when the parking structure 100 does not have a ceiling or wall in an area where a sensor device is to be located, the sensor device 120-126 can be secured to a pole or to an elevated structure. The sensor devices 120-126 illustrated in FIG. 1 can be secured in any of those manners.

In accordance with aspects of the present disclosure, each sensor device 120-126 includes a sensor device housing, an image capture device such as a camera, and a wireless detector device. The image capture device and the wireless detector device will be described in more detail in connection with FIG. 3. For now, it is sufficient to note that the image capture device operates to capture images and can include, for example, components such as lenses, charge-coupled device light sensors, image signal processors, controllers, storage memory, and/or a communication interface, and/or other components which persons skilled in the art will recognize as being present in a device that captures and communicates images. The wireless detector device operates to scan for wireless device identifiers and can include, for example, components such as radio antennas and controllers and/or other components which persons skilled in the art will recognize as being present in a device that scans for wireless device identifiers. The wireless detector device can scan for any type of wireless device, including, without limitation, Wi-Fi device identifiers, Bluetooth device identifiers, and/or cellular device identifiers, among others. Because modern vehicles come equipped with wireless devices and drivers also carry wireless devices, the wireless detector device will almost certainly be able to detect a wireless device in the vicinity of a vehicle. As will be explained in more detail below in connection with FIG. 3, the image capture devices capture images of vehicles and the wireless detector devices detect wireless device identifiers in the vicinity of the vehicles, with the aim of identifying wireless device identifiers that may be a surrogate for or an alternative to a vehicle license plate identifier.

The sensor devices 120-126 can have various shapes and dimensions, and the illustrated embodiment in FIG. 1 is merely exemplary. Various shapes are contemplated for the sensor device housing. In various embodiments, a single sensor device housing contains both the image capture device and the wireless detector device. In various embodiments, the sensor device may not be a unitary device, and the image capture device and the wireless detector device may have separate housings. In accordance with aspects of the present disclosure, whether the image capture device and the wireless detector device are contained in a single housing or separately in different housings, they are located sufficiently close to each other such that information captured by the two devices can be meaningfully associated with each together. In various embodiments, for example, the image capture device and the wireless detector device can be positioned approximately ten feet or less apart. In various embodiments, another distance is contemplated. The distance can vary depending on, for example, the resolving ability and/or field of view of the image capture device, and/or depending on the sensitivity of the wireless detector device. The sensor devices 120-126 can include other components not expressly described herein, such as visual indicators, audio indicators, wired or wireless communication capabilities, and/or other types of sensors, among other things.

Figure 2:
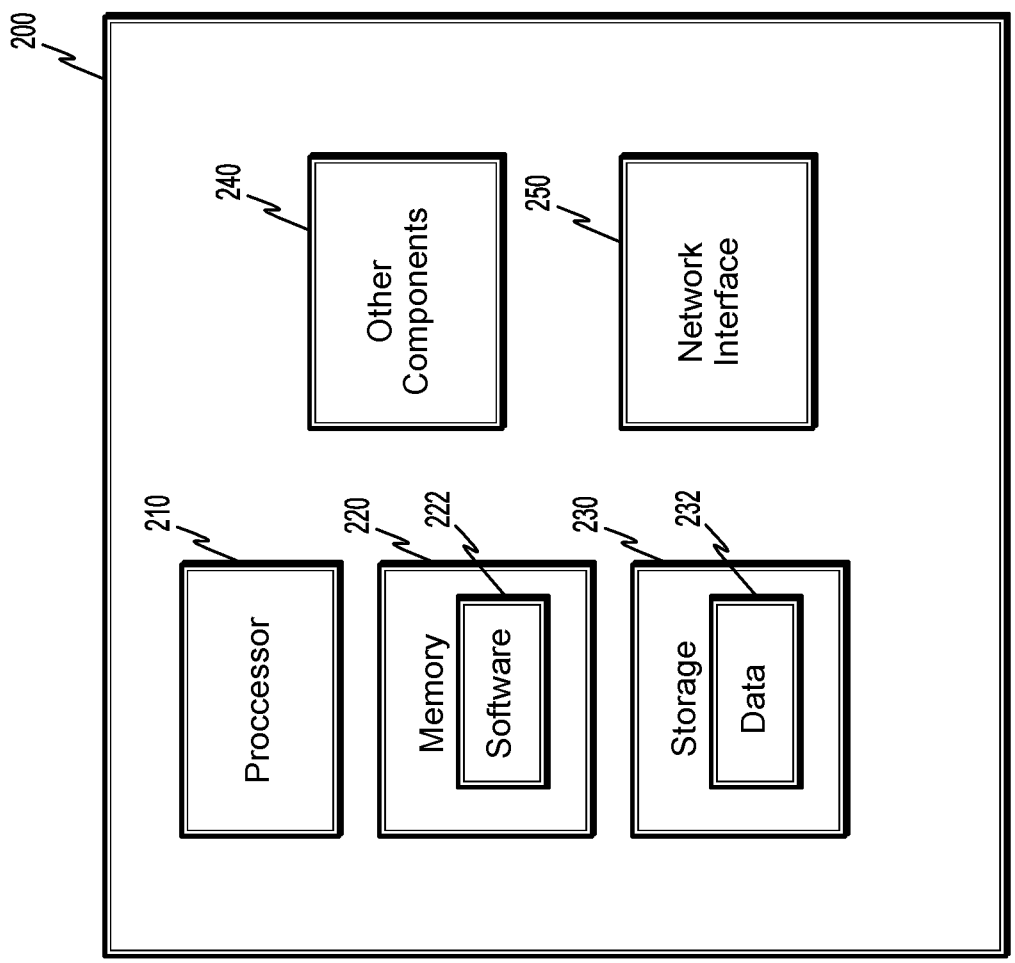
FIG. 2 is a diagram of an exemplary system for storing and processing data from parking structure sensors, in accordance with aspects of the present disclosure.

Referring now to FIG. 2, there is shown a diagram of an exemplary system for storing and processing data from parking structure sensors. The illustrated storage and processing system 200 includes a processor 210, a memory 220, a storage 230, a network interface 240, and other components 250, which will be described in more detail later herein. In various embodiments, the storage and processing system 200 can be located at each sensor device (120-126, FIG. 1) of a parking structure. In various embodiments, the storage and processing system 200 can be located away from the sensor devices (120-126, FIG. 1) but in another area of a parking structure. In various embodiments, the storage and processing system 200 can be located away from and/or remote from the parking structure (100, FIG. 1), such as in a cloud system. Combinations of such configurations are contemplated. For example, in various embodiments, some components and operations can be implemented at each sensor device or at the parking structure, while other operations can be implemented remotely, such as in a cloud system.

In accordance with aspects of the present disclosure, the storage 230 can be any type of device that can store data captured by the sensor devices of the parking structure. The storage 230 can include, for example, a solid-state device, a hard drive, and/or an optical storage device, among other things. The data stored in the storage 230 can include images captured by an image capture device of the parking structure and can include wireless device identifiers detected by a wireless detector device of the parking structure, among other things. Such data will be described in more detail in connection with FIG. 3.

In the storage and processing system 200, the memory 220 can be random-access memory or another type of volatile memory. The memory stores software instructions 222 for performing various operations, such as character recognition operations and other data processing operations, which will be described in more detail in connection with FIG. 3. The processor 210 cooperates with the memory 220 to execute the software instructions 222 to carry out such operations. In various embodiments, the processor 210 can be or can include a central processing unit, a microcontroller, a digital signal processor, an FPGA, a programmable logic device, and/or another type of processing device.

When the storage and processing system 200 is co-located with the image capture device and the wireless detector device, the image capture device and the wireless detector device can form the other components 240 shown in FIG. 2. In such a configuration, the data captured by the image capture device and the wireless detector device can be stored in the storage 230 via a local connection, such as universal serial bus or another type of local connection. The stored data 232 can be communicated to a remote system using the network interface 250, which can be a wired interface such as Ethernet or a wireless interface such as Wi-Fi.

When the storage and processing system 200 is located remotely from the image capture device and the wireless detector device, those devices can communicate their data to the storage and processing system 200 through one or more networks (not shown), which can include proprietary networks and/or public networking infrastructure. The network interface 250 of the storage and processing system 200 can receive the data communicated to it, and the processor 210 can cause the data 232 to be stored in the storage 230 for processing.

Figure 3:
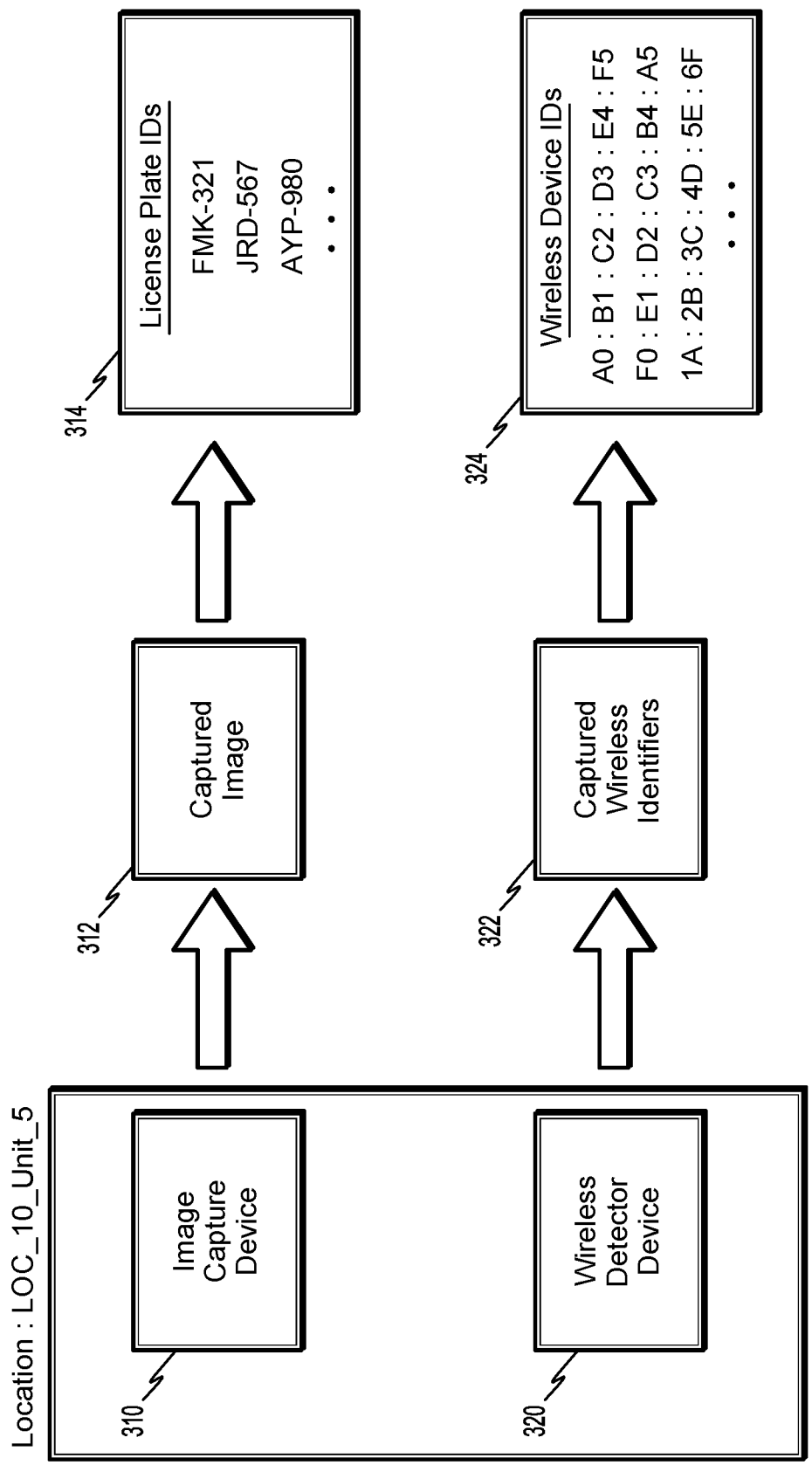
FIG. 3 is a diagram of an exemplary operation of associating license plate identifiers with wireless device identifiers, in accordance with aspects of the present disclosure.

FIG. 3 is a diagram of an exemplary operation relating to data captured by an image capture device such as a camera and by a wireless detector device. As mentioned above, an image capture device 310 captures images 312 of vehicles and the wireless detector device 320 detects wireless device identifiers 312 in the vicinity of the vehicles. Thus, the image capture device 310 and the wireless detector device 320 are positioned sufficiently close to each other such that the data they capture can be meaningfully associated with each other. As mentioned above, in various embodiments, the image capture device 310 and the wireless detector device 320 can be positioned approximately ten feet or less apart, but other distances are contemplated. The image capture device 310 and the wireless detector device 320 can be contained in a single housing or can be separated in different housings. In various embodiments, the image capture device 310 and the wireless detector device 320 can communicate with each other to capture information at substantially the same time or to capture information within a particular time period. In various embodiments, the information capture can occur when the image capture device 310 or a separate motion detector (not shown) detects movement. Persons skilled in the art will recognize ways to implement such communication and coordination.

With continuing reference to FIG. 3, the image capture device 310 and the wireless detector device 320 can be associated with a location identifier, which in the example of FIG. 3 is designated as LOC 10 UNIT 5. In various embodiments, an image capture device 310 and a related wireless detector device 320 can both be associated with the same location identifier. The association of the location identifier can be implemented in various ways. In various embodiments, the image capture device 310 and the wireless detector device 320 can each store the location identifier and include the identifier as metadata in the data it captures. In various embodiments, the image capture device 310 and the wireless detector device 320 may not store the location identifier. Rather, the association of the location identifier with those devices can be maintained by a storage and processing system (200, FIG. 2). In such an embodiment, the data captured by the image capture device 310 and the wireless detector device 320 can be tagged with the serial number or another identifier of such devices, and the storage and processing system can match such data to the associated location identifier based on the serial number or other identifier. In various embodiments, the data captured by the devices 310, 320 can be tagged with or can include other information, such as a time stamp of when the data was captured.

The image 312 captured by the image capture device 310 can have any suitable format, such as JPEG or TIFF, among others. Depending on the location and configuration of the image capture device 310, the captured image 312 can include a single parking bay or multiple parking bays (110, FIG. 1). With reference also to FIG. 1, the captured image 312 can, for example, capture one or more parking bays on one side of a driving lane 112, or can parking bays on both sides of a driving lane 112. Also, the captured image 312 can include one vehicle or multiple vehicles. In accordance with aspects of the present disclosure, the storage and processing system (200, FIG. 2) processes the captured image 312 to extract license plate identifiers 314, and stores the license plate identifiers 312 in text format. Persons skilled in the art will recognize various ways to implement the extraction process, such as using statistical, machine vision, and/or machine learning techniques. The extraction process may or may not successfully or accurately extract every license plate due to various factors, such as a license plate being obscured or damaged, for example. Various ways to address such difficulties are explained in connection with FIGS. 4-6.

In various embodiments, extracted license plate identifiers 314 can be stored and processed even when the extraction process may not be confident of the accuracy.

The identifiers 322 captured by the wireless detector device 320 can have various formats and can include various types of information, such as media access control (MAC) addresses, physical addresses, user-assigned device names, ICCID numbers, and/or service set identifiers (SSID), among others. As used herein, the term "wireless device identifier" is intended to encompass all such types of information that can identify a wireless device. The wireless device identifiers 322 can be received by a storage and processing system (200, FIG. 2), which can separate different types of identifiers, as appropriate, and can store the various identifiers. As described in more detail below, aspects of the present disclosure operate to store and associate the license plate identifiers 314 and the wireless device identifiers 324 in various ways.

Figure 4:
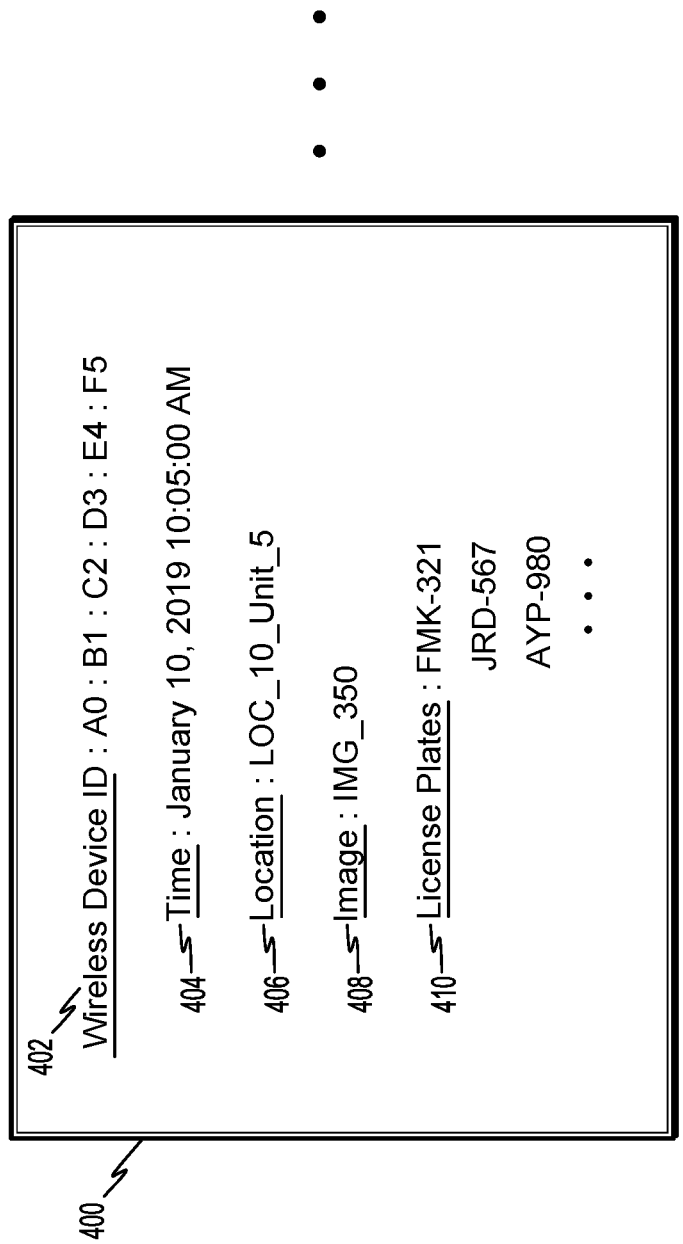
FIG. 4 is a diagram of an exemplary data record associated with a particular wireless device identifier, in accordance with aspects of the present disclosure.

Referring now also to FIG. 4, there is shown a diagram of an exemplary data record 400 that associates a particular wireless device identifier with other information. The record 400 is a result of processing the license plate identifiers 314 and the wireless device identifiers 324 shown in FIG. 3, as well as processing various information associated with those identifiers, such as a time stamp and a location identifier. In various embodiments, the illustrated record can be created for each wireless device identifier 324 of FIG. 3. Various ways of creating and storing data records will be recognized by persons skilled in the art, including using technologies such as relational database management systems and structured query language. The illustrated record 400 can be stored in a storage and processing system, such as the system 200 of FIG. 2.

The illustrated record 400 includes one wireless device identifier which will be referred to as a reference wireless device identifier 402, a time stamp 404, a location identifier 406, an associated image 408, and associated license plate identifiers 410. The image 406 in the record 400 is the image captured by the image capture device of FIG. 3 (i.e., captured image 312) and can include an image file name. In various embodiments, the time stamp 404 can include the time stamp associated with the captured image 312 and/or the time stamp associated with the captured wireless device identifiers 322. In various embodiments, the license plate identifiers 410 in the record 400 can include every license plate identifier extracted in FIG. 3 (i.e., license plate identifiers 314). Various uses of the illustrated record 400 will be described later herein, including using the record 400 together with other records to identify a license plate identifier for which the reference wireless device identifier 402 can serve as a surrogate identifier or an alternative identifier.

Figure 5:
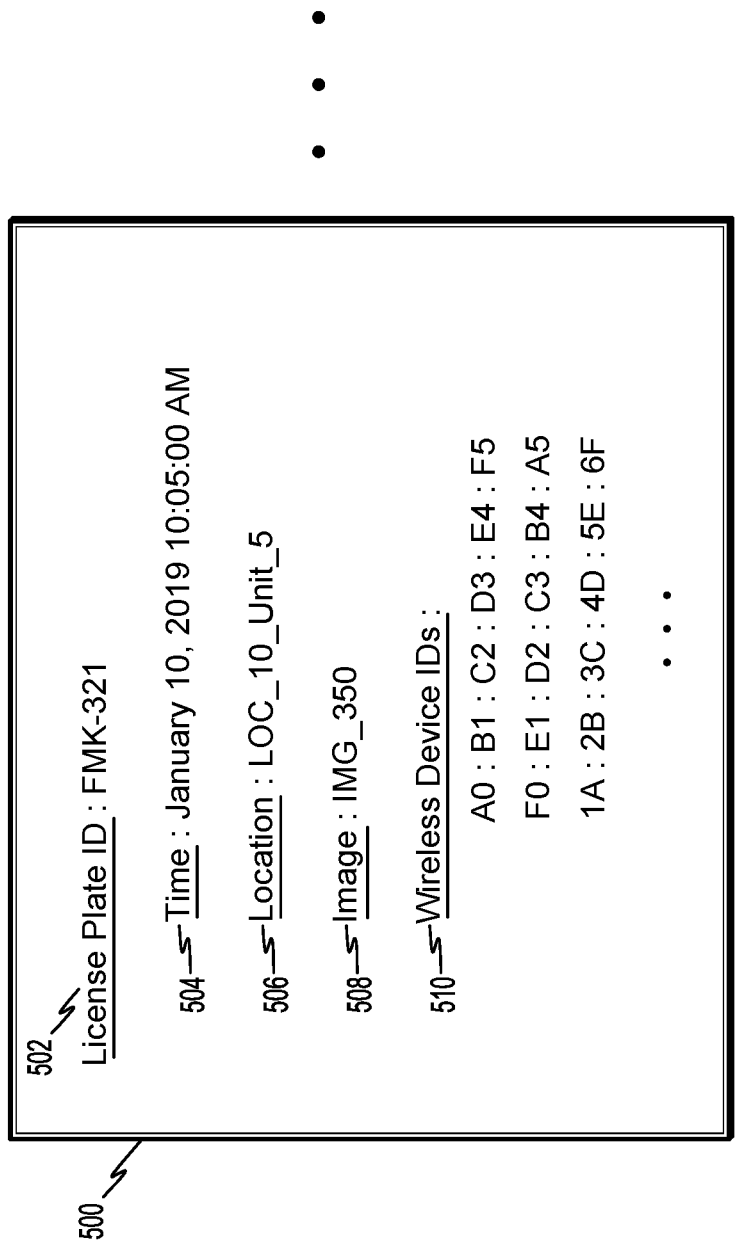
FIG. 5 is a diagram of an exemplary data record associated with a particular license plate identifier, in accordance with aspects of the present disclosure.

FIG. 5 is a diagram of an exemplary data record that associate a particular license plate identifier with other information. As with FIG. 4, the record 500 of FIG. 5 is a result of processing the license plate identifiers 314 and the wireless device identifiers 324 shown in FIG. 3, as well as processing various information associated with those identifiers, such as a time stamp and a location identifier. In various embodiments, the illustrated record of FIG. 5 can be created for each license plate identifier 314 of FIG. 3. The illustrated record 500 can be stored in a storage and processing system, such as the system 200 of FIG. 2.

The illustrated record 500 includes one license plate identifier which will be referred to as a reference license plate identifier 502, a time stamp 504, a location identifier 506, an associated image 508, and associated wireless device identifiers 510. The image 506 in the record 500 is the image captured by the image capture device of FIG. 3 (i.e., captured image 312) and can include an image file name. In various embodiments, and with reference also to FIG. 3, the time stamp 504 can include the time stamp associated with the captured image 312 and/or the time stamp associated with the captured wireless device identifiers 322. In various embodiments, the wireless device identifiers 510 in the record 500 can include every wireless device identifier captured in FIG. 3 (i.e., wireless device identifiers 324). Various uses of the illustrated record 500 will be described later herein, including using the record 500 together with other records to identify a wireless device identifier which can serve as a surrogate identifier or an alternative identifier for the reference license plate identifier 502.

The data records of FIG. 4 and FIG. 5 are exemplary, and other configurations and contents are contemplated. For example, in various embodiments, a data record can include multiple wireless device identifiers as well as multiple license plate identifiers. In various embodiments, a data record can include information about a vehicle in addition to a license plate identifier, such as color, make, model, and vehicle type, among other things. An example of using such additional information to form a "signature" for an unidentified vehicle will be described in connection with FIG. 9.

Figure 6:
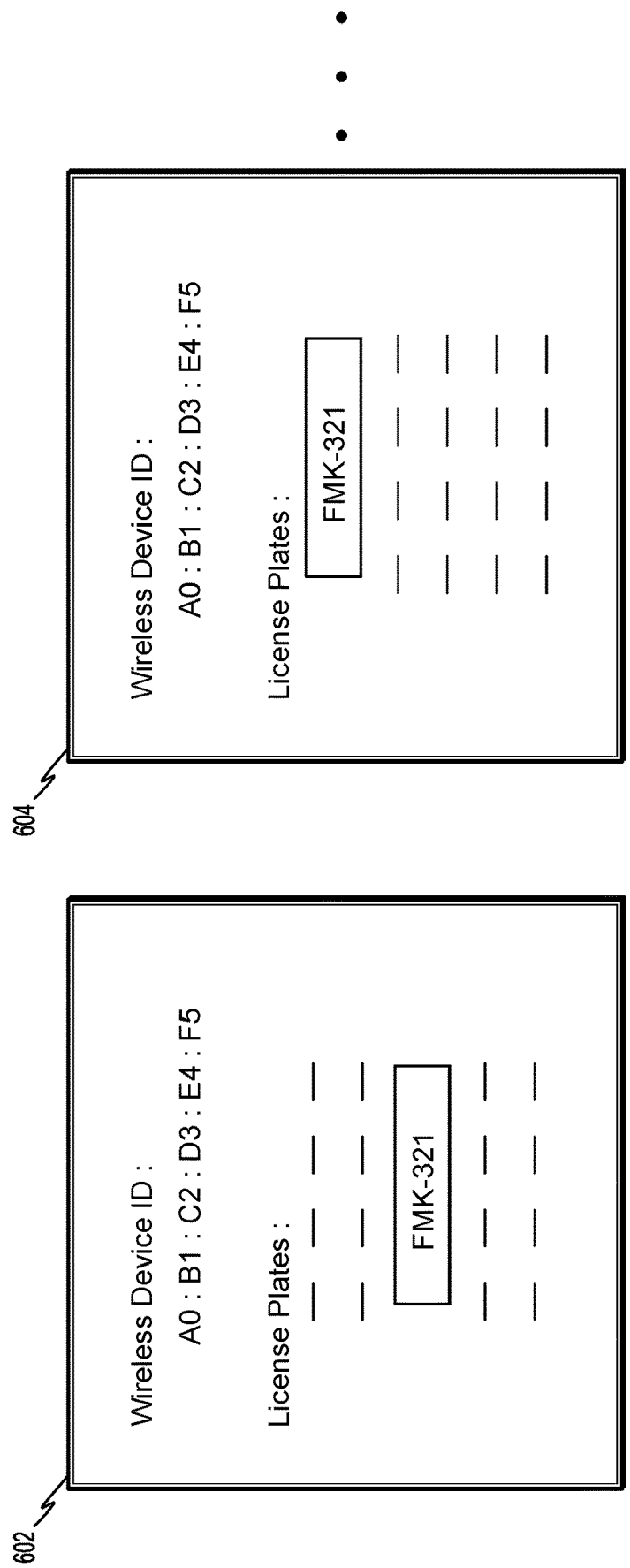
FIG. 6 is a diagram of exemplary data records of the type shown in FIG. 4.

Referring now to FIG. 6, multiple data records of the type shown in FIG. 4, are illustrated. In various embodiments, the illustrated records can be stored in the storage and processing system 200 of FIG. 2 and can be processed by software instructions 222 of such a system. As data records accumulate over time, it becomes more likely that patterns can become recognizable. FIG. 6 illustrates an example of such a pattern where a particular license plate identifier FMK-321 appears frequently in data records for the reference wireless device identifier A0:B1:C2:D3:E4:F5. Such a pattern may allow the wireless device identifier A0:B1:C2:D3:E4:F5 to be used as a surrogate or as an alternative to the license plate identifier FMK-321.

Figure 7:
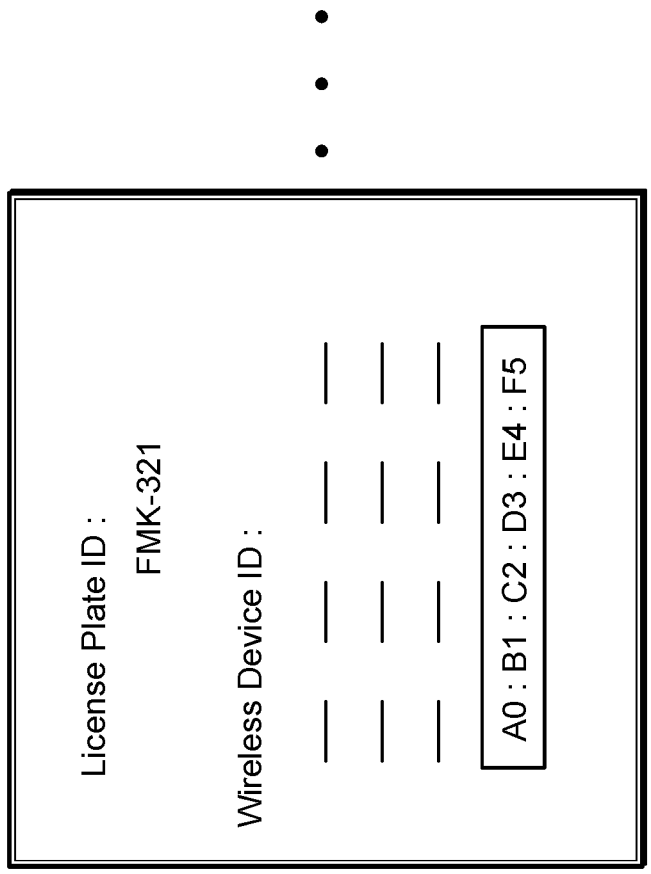
FIG. 7 is a diagram of exemplary data records of the type shown in FIG. 5.
Figure 7:
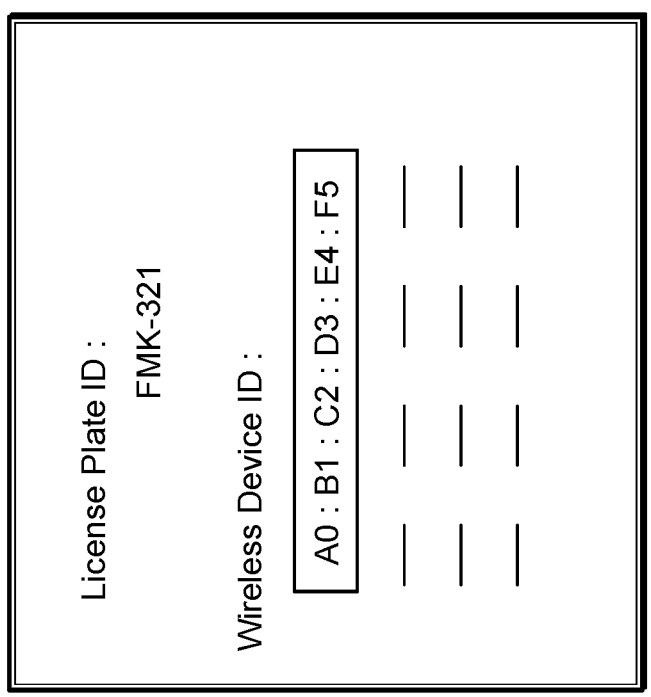

FIG. 7 shows an illustration of multiple records of the type shown in FIG. 5, and is an example of a pattern where a particular wireless device identifier A0:B1:C2:D3:E4:F5 appears frequently in data records for the reference license plate identifier FMK-321. Similar to the example of FIG. 6, such a pattern may allow the wireless device identifier A0:B1:C2:D3:E4:F5 to be used as a surrogate or as an alternative to the license plate identifier FMK-321.

Various ways are contemplated for identifying a particular wireless device identifier to be a surrogate or an alternative for a reference license plate identifier. In various embodiments, based on processing the records shown in FIG. 6 and/or FIG. 7, the highest occurrence can be selected. In the example of FIG. 6, if the license plate identifier FMK-321 has the most occurrences in the records, then wireless device identifier A0:B1:C2:D3:E4:F5 can be designated to be a surrogate or alternative to license plate identifier FMK-321. In the example of FIG. 7, if the wireless device identifier A0:B1:C2:D3:E4:F5 has the most occurrences in the records, then wireless device identifier A0:B1:C2:D3:E4:F5 can be designated to be a surrogate or alternative to license plate identifier FMK-321. In various embodiments, the determination can be subject to an occurrence threshold, such that an association of a license plate identifier with a wireless device identifier is created only if the highest occurrence occurs more than a particular number of times. In various embodiments, the occurrence threshold can be two or five, or another number. In various embodiments, the data records can be processed to determine a second-highest occurrence, or a third-highest occurrence, and so on. Such further determinations can also be subjected to an occurrence threshold.

In various embodiments, the data records in FIG. 6 and the data records in FIG. 7 can be separately processed to determine an association (if any) based on the records of FIG. 6 and to determine an association (if any) based on the records of FIG. 7. In various embodiments, an association of a license plate identifier with a wireless device identifier is created only if the association formed based on the records of FIG. 6 is the same as the association formed based on the records of FIG. 7.

Referring now to FIG. 8, there is shown another set of records related to tracking a vehicle through a parking structure. With reference also to FIG. 1, and as mentioned above, the parking structure 100 includes various sensor devices 120-126 located in different locations of the parking structure 100, including a sensor device 120 located at the entrance 102 to the parking structure 100. The sensor devices 120-126 can capture information when there is motion in their respective fields of view, and a single vehicle that enters and travels through the parking structure 100 can be captured by multiple sensor devices. For example, a vehicle can be first captured by a sensor device 120 upon entering the entrance 102, then captured by a sensor device 122 upon proceeding from the entrance 102 to the driving lane 112, and then captured by a sensor device 124 upon proceeding through the driving lane 112 and parking in one of the parking bays 110. A progression of such information captures provides records having time stamps that are close in time and having location identifiers that may be sequential, as shown in FIG. 8.

In accordance with aspects of the present disclosure, a storage and processing system can process data records to identify patterns that indicate the tracking of a vehicle travelling through a parking structure, such as the patterns embodied in FIG. 8. In various embodiments, the pattern can include a particular license plate identifier being captured by different sensor devices within a predetermined period of time, such as within a thirty-second or one-minute period of time, or another period of time. In various embodiment, the pattern can include a particular license plate identifier being captured by a sequence of adjacent sensor devices. In various embodiments, the pattern can involve thresholds, such as, for example, identifying the pattern only when sequences of three or more sensor devices are involved. FIG. 8 illustrates a sequence of records meeting one or more of the foregoing patterns. The foregoing patterns are exemplary, and variations are contemplated to be within the scope of the present disclosure. For example, combinations of the foregoing patterns are contemplated to be within the scope of the present disclosure.

In accordance with aspects of the present disclosure, a storage and processing system can process the records shown in FIG. 8 to determine whether a wireless device identifier can be identified as a surrogate for or as an alternative to a license plate identifier. In various embodiments, when a pattern indicative of tracking a vehicle through a parking structure is identified, a wireless device identifier that appears in all records of the identified pattern can be designated as a surrogate for or as an alternative to the reference license plate identifier. In the example of FIG. 8, the reference license plate identifier is FMK-321, and the wireless device identifier that appears in all records of the pattern is A0:B1:C2:D3:E4:F5. Accordingly, the wireless device identifier A0:B1:C2:D3:E4:F5 can be designated as a surrogate for or as an alternative to license plate identifier FMK-321. The records illustrated in FIG. 8 are exemplary, and other information or different information can be included in the records.

Figure 9:
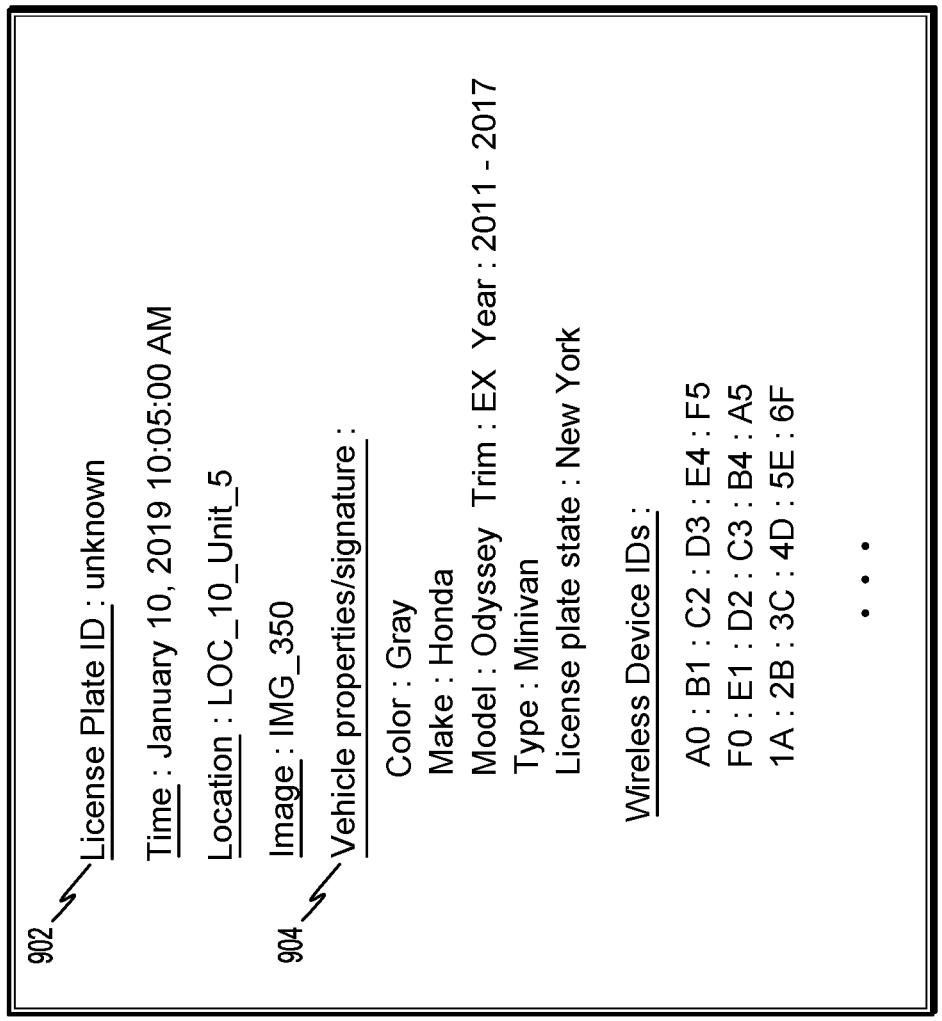
FIG. 9 is a diagram of an exemplary data record storing properties of a vehicle.

Referring now to FIG. 9, there is shown an example of a data record which can be used when a license plate identifier cannot be extracted. As shown in FIG. 9, the license plate identifier 902 is indicated as unknown. A license plate extraction may fail, for example, when a vehicle's license plate is obscured or damaged. In accordance with aspects of the present disclosure, a storage and processing system can analyze a captured image to extract other features or properties of a vehicle 904, including, for example, vehicle color, make, model, trim, and/or potential model year, vehicle type, and/or license plate state. The vehicle type can include, for example, coupe, sedan, hatchback, sports utility vehicle, and minivan, among other vehicle types. In various embodiments, even when a license plate identifier cannot be extracted, it may be possible to identify the state that issued the license plate based on the license plate design. Other vehicle properties are contemplated to be within the scope of the present disclosure, such whether the vehicle is a convertible, has a sun roof, and/or has a spoiler, among other features or properties. As another example, the data record can include an image of the wheel rims or features of the wheel rims, such as number of spokes. Such vehicle properties and other variations are contemplated to be within the scope of the present disclosure. A storage and processing system can process a captured image to extract such properties using statistical, machine vision, and/or machine learning techniques.

In accordance with aspects of the present disclosure, a vehicle's properties 904 can form a fingerprint or signature for a vehicle whose license plate identifier 902 is unknown. In various embodiments, certain properties can be mandatory properties that are required for the vehicle fingerprint/signature to be used in place of an unknown license plate identifier, such as, for example, vehicle color, make, model, and type. If any mandatory property is missing, the vehicle fingerprint/signature 904 cannot be used in place of a license plate identifier 902. In various embodiments, a threshold number of properties can be required for a vehicle fingerprint/signature 904 to be used in place of a license plate identifier 902, such as eight properties or ten properties, or another number of properties. The record of FIG. 9 is exemplary, and other information or different information can be used in the record. Such variations are contemplated to be within the scope of the present disclosure.

In accordance with aspects of the present disclosure, when a vehicle signature/fingerprint is designated to be used in place of a license plate identifier, any aspects described herein relating to a license plate identifier also applies to a vehicle signature/fingerprint. For example, in relation to FIG. 7, a wireless device identifier that has the highest occurrence in data records having the same vehicle fingerprint/signature, can be designated as a surrogate for or as an alternative to the vehicle fingerprint/signature. In relation to FIG. 8, patterns indicative of tracking a vehicle through a parking structure can be applied to vehicle fingerprints/signatures in the same manner that they are applied to license plate identifiers. Other aspects described herein also apply to vehicle fingerprints/signatures in the same manner that they apply to license plate identifiers.

Figure 10:
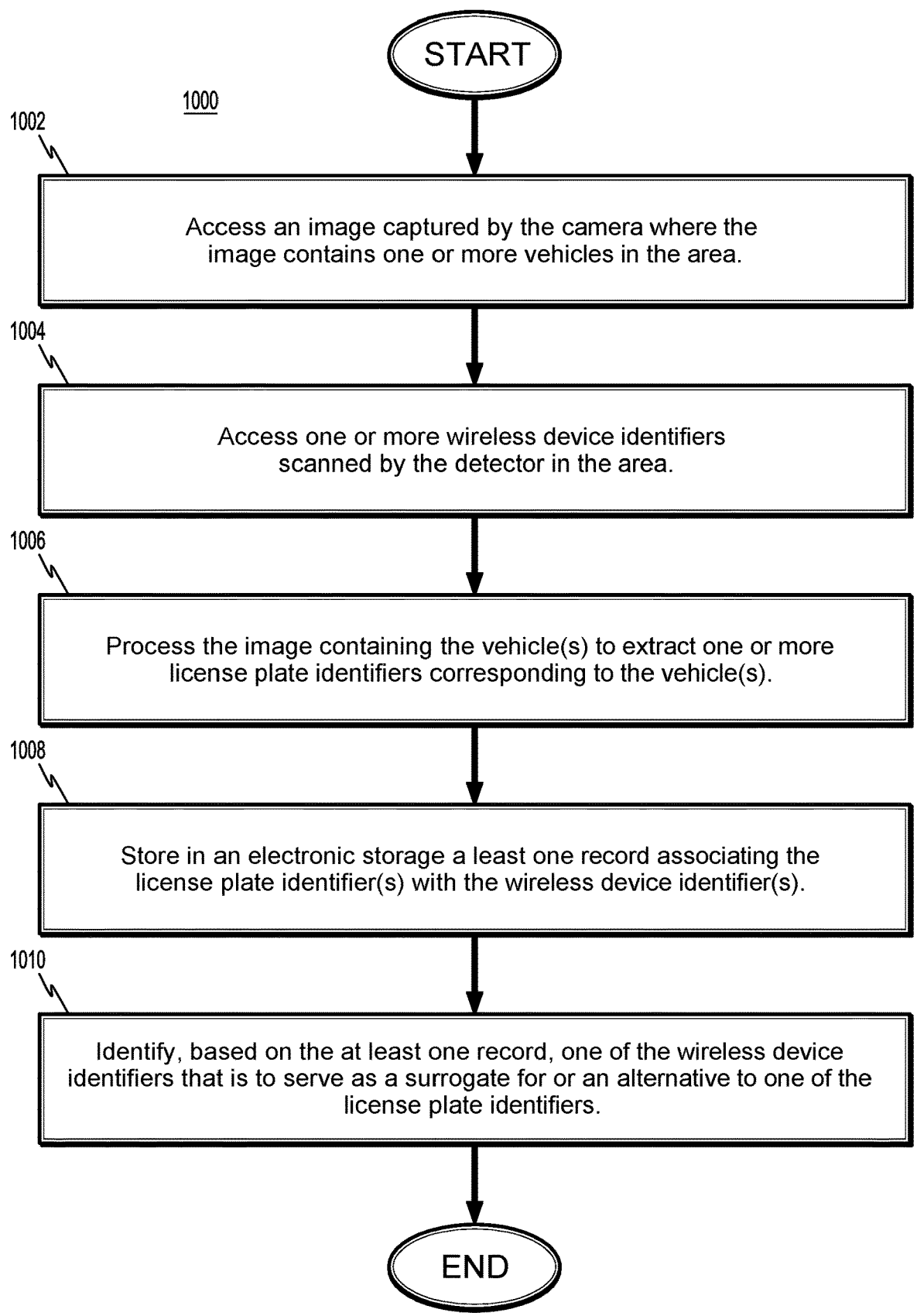
FIG. 10 is a flowchart of an exemplary operation for identifying a vehicle.

Referring to FIG. 10, there is shown a flowchart of an exemplary operation 1000 for identifying vehicles in a parking structure. The parking structure includes a camera configured to capture images of an area in the parking structure and a detector configured to scan for wireless device identifiers in the area. At block 1002, the operation accesses an image captured by the camera where the image contains one or more vehicles in the area. At block 1004, the operation accesses one or more wireless device identifiers scanned by the detector in the area. At block 1006, the operation processes the image containing the vehicle(s) to extract one or more license plate identifiers corresponding to the vehicle(s). At block 1008, the operation stores in an electronic storage at least one record associating the license plate identifier(s) with the wireless device identifier(s). At block 1010, the operation identifies, based on the at least one record, one of the wireless device identifiers that is to serve as a surrogate for or an alternative to one of the license plate identifiers.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed:

1. A system for identifying vehicles in a parking structure, the system comprising:
   a camera configured to capture images of an area in the parking structure, the camera capturing an image containing at least one vehicle in the area;
   a detector configured to scan for wireless device identifiers in the area; and
   a processing system including an electronic storage, the processing system configured to execute instructions to:
      access the image containing the at least one vehicle in the area and access at least one wireless device identifier scanned by the detector in the area,
      process the image containing the at least one vehicle to extract at least one license plate identifier corresponding to the at least one vehicle,
      store in the electronic storage at least one record associating the at least one license plate identifier with the at least one wireless device identifier, the at least one record including a record configured to associate one license plate identifier from the at least one license plate identifier with multiple wireless device identifiers,
      access, from the electronic storage, a plurality of records, each of the plurality of records associating the one license plate identifier with a set of one or more wireless device identifiers,
      process the plurality of records to identify a first wireless device identifier having a highest number of occurrences in the plurality of records, and
      indicate the first wireless device identifier as an alternative to the one license plate identifier for identifying a vehicle.

2. The system of claim 1, wherein the at least one record includes a record configured to associate one wireless device identifier with multiple license plate identifiers.

3. The system of claim 2, wherein the at least one record includes a plurality of records relating to the one wireless device identifier, each of the plurality of records associating the one wireless device identifier with a set of one or more license plate identifiers.

4. The system of claim 3, wherein the processing system is further configured to execute the instructions to:
   process the plurality of records relating to the one wireless device identifier to identify a first license plate identifier for which the one wireless device identifier is to be indicated as an alternative; and
   indicate the one wireless device identifier as an alternative to the first license plate identifier.

5. A system for identifying vehicles in a parking structure, the system comprising:
   a camera configured to capture images of an area in the parking structure, the camera capturing an image containing at least one vehicle in the area;
   a detector configured to scan for wireless device identifiers in the area; and
   a processing system including an electronic storage, the processing system configured to execute instructions to:
      access the image containing the at least one vehicle in the area and access at least one wireless device identifier scanned by the detector in the area,
      process the image containing the at least one vehicle to extract at least one license plate identifier corresponding to the at least one vehicle,
      store in the electronic storage at least one record associating the at least one license plate identifier with the at least one wireless device identifier, the at least one record including a record configured to associate one license plate identifier from the at least one license plate identifier with multiple wireless device identifiers,
      access, from the electronic storage, a plurality of records, each of the plurality of records associating the one license plate identifier with a set of one or more wireless device identifiers,
      process the plurality of records to identify a first wireless device identifier to be indicated as an alternative to the one license plate identifier, indicate the first wireless device identifier as an alternative to the one license plate identifier for identifying a vehicle, access a second image and a second plurality of wireless device identifiers;

determine that a license plate identifier cannot be extracted from the second image;

identify, based on the electronic storage, at least one wireless device identifier of the second plurality of wireless device identifiers which is indicated as an alternative to a corresponding license plate identifier; and generate a task record associating the second image with the at least one corresponding license plate identifier.

6. The system of claim 5, wherein the processing system is further configured to execute the instructions to: communicate a notification to personnel at the parking structure regarding the task record, the notification including a list of the at least one corresponding license plate identifier.

7. The system of claim 1, wherein the wireless device identifiers include Bluetooth device identifiers, and wherein the processing system includes a cloud system outside the parking structure.

8. The system of claim 1, wherein the processing system is further configured to execute the instructions to:

process the image containing the at least one vehicle to extract at least one visual characteristic corresponding to a particular vehicle of the at least one vehicle to provide a digital fingerprint for the particular vehicle, and store the digital fingerprint in the electronic storage in at least one of the at least one record.

9. A method for identifying vehicles in a parking structure having a camera configured to capture images of an area in the parking structure and a detector configured to scan for wireless device identifiers in the area, the method comprising:

accessing an image captured by the camera, the image containing at least one vehicle in the area;

accessing at least one wireless device identifier scanned by the detector in the area;

processing the image containing the at least one vehicle to extract at least one license plate identifier corresponding to the at least one vehicle;

storing in an electronic storage at least one record associating the at least one license plate identifier with the at least one wireless device identifier, the at least one record including a record configured to associate one license plate identifier from the at least one license plate identifier with multiple wireless device identifiers;

accessing, from the electronic storage, a plurality of records, each of the plurality of records associating the one license plate identifier with a set of one or more wireless device identifiers;

processing the plurality of records to identify a first wireless device identifier having a highest number of occurrences in the plurality of records; and indicating the first wireless device identifier as an alternative to the one license plate identifier for identifying a vehicle.

10. The method of claim 9, wherein the at least one record includes a record configured to associate one wireless device identifier with multiple license plate identifiers.

11. The method of claim 10, wherein the at least one record includes a plurality of records relating to the one wireless device identifier, each of the plurality of records associating the one wireless device identifier with a set of one or more license plate identifiers.

12. The method of claim 11, further comprising:

processing the plurality of records relating to the one wireless device identifier to identify a first license plate identifier for which the one wireless device identifier is to be indicated as an alternative; and indicating the one wireless device identifier as an alternative to the first license plate identifier.

13. A method for identifying vehicles in a parking structure having a camera configured to capture images of an area in the parking structure and a detector configured to scan for wireless device identifiers in the area, the method comprising:

accessing an image captured by the camera, the image containing at least one vehicle in the area;

accessing at least one wireless device identifier scanned by the detector in the area;

processing the image containing the at least one vehicle to extract at least one license plate identifier corresponding to the at least one vehicle;

storing in an electronic storage at least one record associating the at least one license plate identifier with the at least one wireless device identifier, the at least one record including a record configured to associate one license plate identifier from the at least one license plate identifier with multiple wireless device identifiers;

accessing, from the electronic storage, a plurality of records, each of the plurality of records associating the one license plate identifier with a set of one or more wireless device identifiers;

processing the plurality of records to identify a first wireless device identifier to be indicated as an alternative to the one license plate identifier;

indicating the first wireless device identifier as an alternative to the one license plate identifier for identifying a vehicle;

accessing a second image and a second plurality of wireless device identifiers;

determining that a license plate identifier cannot be extracted from the second image;

identifying, based on the electronic storage, at least one wireless device identifier of the second plurality of wireless device identifiers which is indicated as an alternative to a corresponding license plate identifier; and generating a task record associating the second image with the at least one corresponding license plate identifier.

14. The method of claim 13, further comprising communicating a notification to personnel at the parking structure regarding the task record, the notification including a list of the at least one corresponding license plate identifier.

15. The method of claim 9, further comprising:

processing the image containing the at least one vehicle to extract at least one visual characteristic corresponding to a particular vehicle of the at least one vehicle to provide a digital fingerprint for the particular vehicle; and storing the digital fingerprint in the electronic storage in at least one of the at least one record.

* * * * *